United States Patent [19]
Farchmin et al.

[11] Patent Number: 5,567,042
[45] Date of Patent: Oct. 22, 1996

[54] REFLECTOR FOR FLAT PANEL DISPLAY BACKLIGHT UNIT

[75] Inventors: David W. Farchmin, Grafton; John S. Clark, Cudahy, both of Wis.

[73] Assignee: Allen-Bradley Company, Inc., Milwaukee, Wis.

[21] Appl. No.: 250,131

[22] Filed: May 27, 1994

[51] Int. Cl.⁶ .................................................. F21V 7/09
[52] U.S. Cl. ........................... 362/241; 362/29; 362/224; 362/225; 362/297; 362/346
[58] Field of Search .................................. 362/224, 225, 362/237, 241, 245, 247, 260, 297, 346, 347, 348, 217, 29

[56] References Cited

U.S. PATENT DOCUMENTS

| | | | |
|---|---|---|---|
| 4,106,083 | 8/1978 | Wolff | 362/217 |
| 4,425,604 | 1/1984 | Imai et al. | 362/225 |
| 4,729,075 | 3/1988 | Brass | 362/217 |
| 4,794,501 | 12/1988 | Bartenbach | 362/217 |
| 4,947,305 | 8/1990 | Gunter, Jr. | 362/297 |
| 5,134,553 | 7/1992 | Hasegawa | 362/225 |
| 5,253,151 | 10/1993 | Mepham et al. | 362/297 |

FOREIGN PATENT DOCUMENTS

| | | | |
|---|---|---|---|
| 442246A2 | 8/1991 | European Pat. Off. | 362/297 |
| 1011484 | 12/1965 | United Kingdom | 362/217 |

*Primary Examiner*—Denise L. Gromada
*Assistant Examiner*—Alan B. Cariaso
*Attorney, Agent, or Firm*—Mark W. Pfeiffer; John D. Franzini; John J. Horn

[57] ABSTRACT

Backlighting for an LCD display is provided by a direct backlight unit which is hinged to the front panel in which the display is mounted. When closed, the backlight unit lamps and reflector transmit light directly against the back of the display. The reflector surfaces are made by a combination of constant radius, hyperbolic, parabolic and flat surfaces which maximize the emitted light transmitted to the display and help fill in for any failed or dimmed light sources.

20 Claims, 3 Drawing Sheets

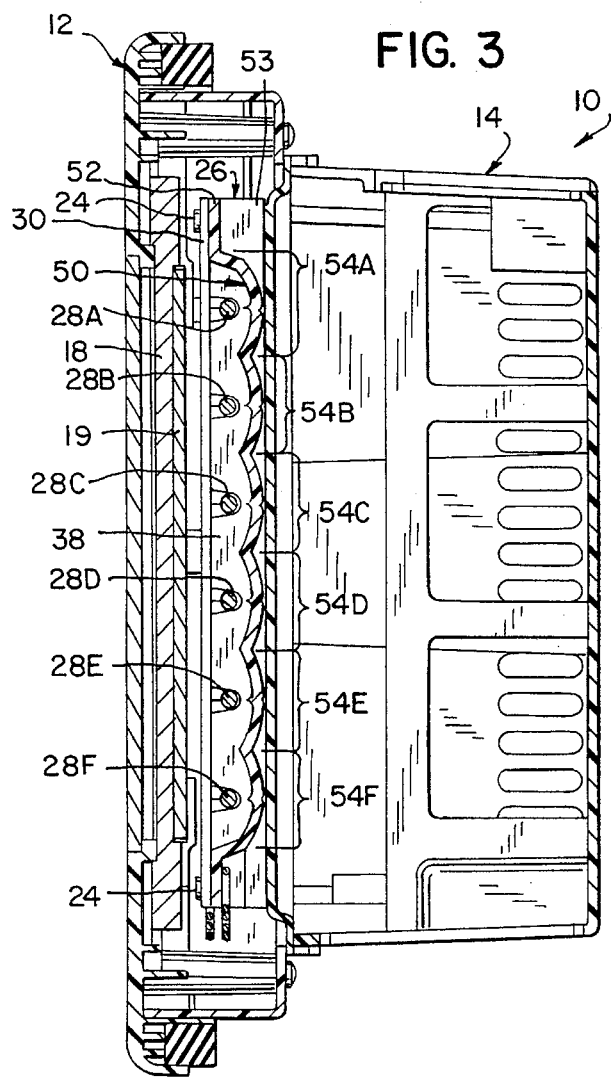
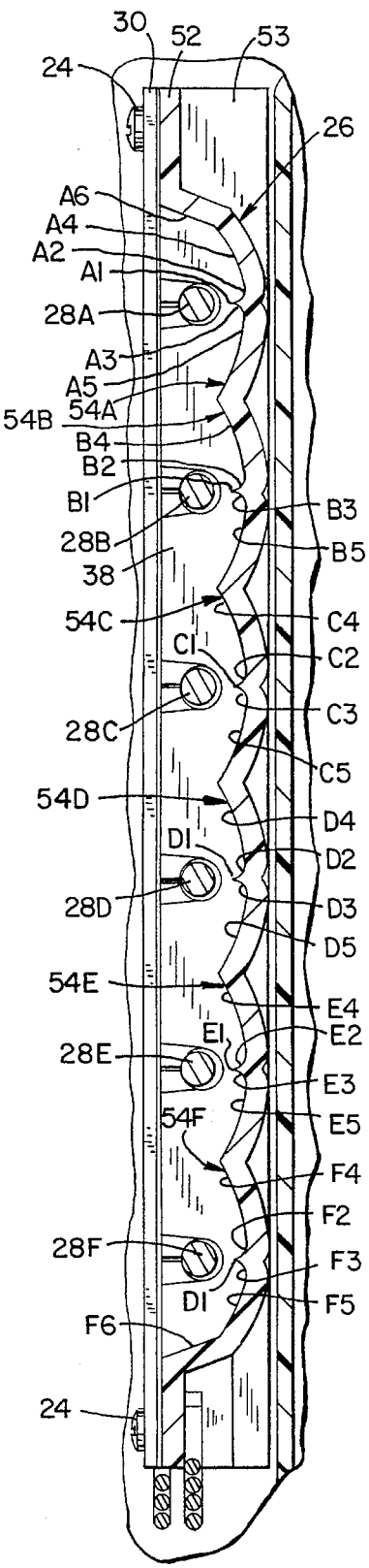
FIG. 3
FIG. 4

REFLECTOR FOR FLAT PANEL DISPLAY BACKLIGHT UNIT

FIELD OF THE INVENTION

This invention relates to flat panel display backlight units and in particular to reflectors for direct backlighting units.

Direct backlighting of liquid crystal displays is well known and reflectors for such backlighting units have been developed. For example, U.S. Pat. No. 5,253,151 which issued Oct. 12, 1993 discloses such reflectors.

It is desirable in backlighting units for flat panel displays that the light produced by the backlight unit be uniform and capable of a high intensity over the entire viewing area of the display. In addition, especially for industrial computer displays where failure of the display can result in a costly loss of production, it is desirable that these backlight displays be durable and reliable, and that they do not fail disastrously.

SUMMARY OF THE INVENTION

The invention provides a reflector for multiple parallel cylindrical light sources of the type having an arcuate reflective surface section for each parallel source. Each surface section defines an apex ridge directly behind the corresponding source and the surface section extending from both sides of the apex ridge in arcuate surfaces. An improvement of the invention is that the arcuate surfaces extending from the apex ridge are defined by constant radius surfaces. Thereby, light being transmitted directly rearward from the source is redirected by the constant radius surface to be reflected by another reflector surface back toward the display. The result is to increase the diffusion of the light reflected from the sources, use more of the light to illuminate the display, and reduce the effect of an adjacent lamp dimming or failing completely, all of which contributes to the effectiveness of a reflector of the invention.

In one useful aspect, at least one of the constant radius surfaces is joined at its edge opposite from the apex ridge by a hyperbolic surface. This is desired in areas of the reflector where dispersion and diffusion of the light from the corresponding bulb is desired, such as for the interior surface sections of the reflector. Thereby, when one lamp burns out, light from the adjacent lamps will be reflected into the area of the burned out lamp to fill in for it and largely preserve the visibility of the display until the backlight unit can be replaced.

For interior surface sections, hyperbolic surfaces are preferably provided on both sides of the apex ridge, whereas for the end surface sections, a parabolic surface is preferable provided on the outer side of the apex ridge. The parabolic surface in this location is useful to collimate the light reflected from the corresponding lamp, so as to direct it toward the display and prevent it from escaping past the edge of the display. A further improvement is that a flat reflector surface may be provided outside from each parabolic surface, to direct redirect light toward the display.

BRIEF DESCRIPTION OF THE DRAWINGS

FIG. 3 is a vertical sectional view through the cabinet shown in FIG. 1 illustrated in a closed position;

FIG. 4 is a detail view of a portion of FIG. 3; and

DETAILED DESCRIPTION OF THE PREFERRED EMBODIMENTS

Figure 1:
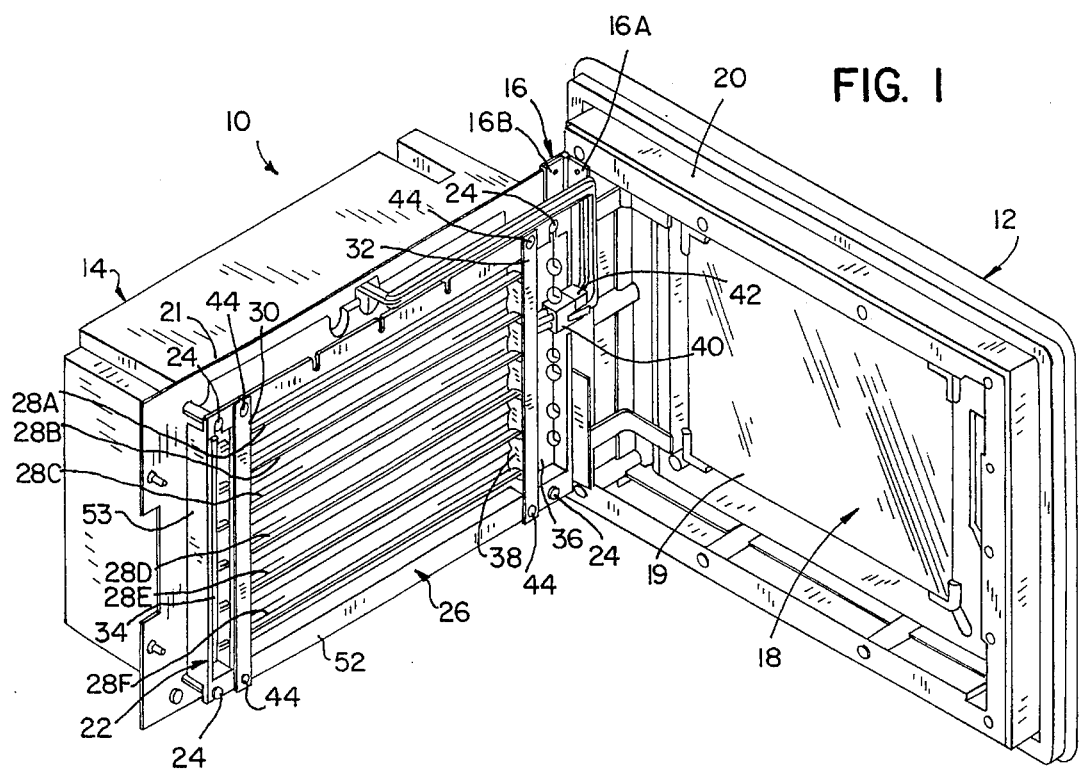
FIG. 1 is a perspective view of a cabinet which incorporates the invention illustrated in an open position.

Referring to FIG. 1, a cabinet 10 incorporating the invention includes a front panel 12 and a cover 14. The cover 14 is secured to the front panel 12 by a hinge 16 secured along corresponding vertical edges of the panel 12 and cover 14 so as to allow pivoting of the cover 14 relative to the panel 12 between the open position shown in FIG. 1 and the closed position shown in FIG. 3.

As best shown in FIGS. 1 and 3, the front panel 12 includes a flat panel display 18 which may be, for example, a thin film transistor (TFT) or metal insulator metal (MIM) type display. However, any flat panel liquid crystal display which is backlit in operation may be used to practice the invention. Preferably, a diffuser plate 19, which may be for example a sheet of white opaque acrylic to diffuse light transmitted against the back of the display 18, directly overlies the back of the display so as to enhance the uniformity of the light transmitted by a backlight unit 22.

The front panel 12 also includes a bezel 20 which frames the display 18 and to which the hinge plate 16A of the hinge 16 is directly connected. Hinge plate 16B of hinge 16 is directly connected to a vertical panel of flange 21 of the cover 14. The cover 14 is made generally in the form of a box so as to house most of the electronic components of the enclosure 10, such as the computer which controls the display 18.

Figure 2:
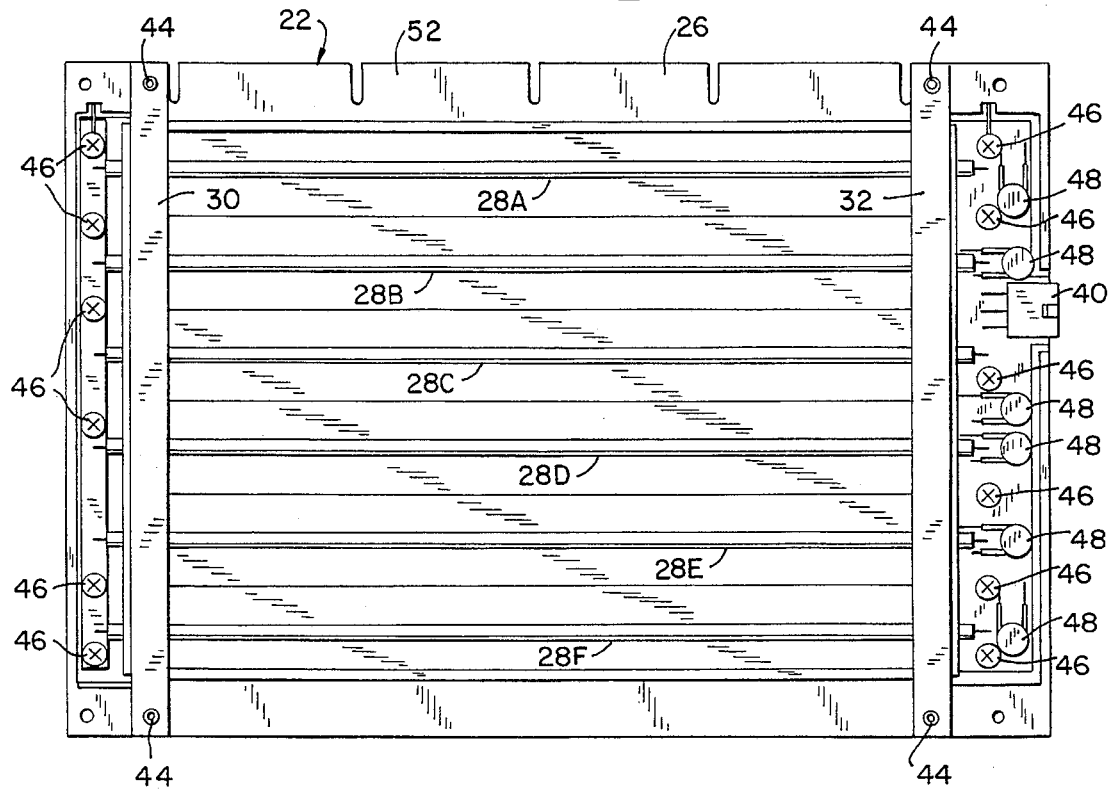
FIG. 2 is a front plan view of a backlight unit of the invention.

The backlight unit 22 is releasably secured with screws 24 to the front of the cover 14 so that when the cover 14 is pivoted to the open position shown in FIG. 1, the front of the backlight unit 22 is exposed as are the heads of the screws 24. The backlight unit 22 is shown by itself in FIG. 2. When the cover 14 is closed as shown in FIG. 3, the backlight unit 22 is moved to within close proximity of the rear of the display 18 and to being parallel to the display 18 so as to transmit light against the rear of the display 18, through the diffuser plate 19. This provides backlighting to the display 18 which is necessary for a user to view the indicia generated by the display 18. In order to ensure adequate cooling of the display 18, it is preferable to maintain an air gap of ¼ to ⅜ inches between the closest surface of the backlight unit 22 and the rear of the diffuser panel 19 in the closed position.

The backlight unit 22 includes a molded plastic reflector 26 which doubles as the structural foundation to which the other components of the backlight unit 22 are secured. These other components include 6 straight cylindrical cold cathode fluorescent lamps (CCFL's) 28A–F, metal strips 30 and 32 along the respective left and right ends of the lamps 28A–F to hold the lamps in position, a left connector strip 34 for making contact with the left electrodes of the lamps 28A–F and a right connector strip 36 for making a electrical contact with the right electrodes of the lamps 28A–F. Elastomeric material 38 is preferably placed between the strips 30 and 32 and the reflector 26 so as to hold the lamps 28A–F securely in position.

In addition, the right connector strip 36 preferably includes a plug half 40 to mate with a mating plug half 42 which is wired to the electronics in the cover 14 so that the backlight unit 22 may be releasably electrically connected to the enclosure 10. Screws 44 secure the strips 30 and 32 to the reflector 26, and screws 46 secure the connector strips 34 and 36 to a peripheral flange 52 of the reflector which extends all the way around the reflector 26, and a wall 53 may be molded at one or both ends of the reflector 26 so as to shield wires routed to the connector strips 34 and 36 from a user. In addition, capacitors 48 may be provided on the right connector strip 36 as is well known so that a single power supply (housed in the cover 14, may be used to power all 6 lamps 28A–F, so as to run the minimum number of wires from the power supply in the cover 14 to the backlight unit 22.

The reflective surface 50 of the reflector 26 is preferably non-specular, for example white. This surface may be painted white using a very white paint. White is the preferred color of the surface 50 so that it reflects light from the lamps 26A–F diffusely, and does not provide any undesirable color shift to the light reflected into the display.

The reflective surface 50 has a unique shape. The reflective surface 50 is constant in cross-sectional shape in the horizontal direction for its length coincident with the horizontal width of the illumination required for the diffuser and display, but vertically the shape of the surface 50 is defined by a complex surface.

The reflective surface 50 is defined by a series of surface sections 54A–F, each of said sections corresponding to one of the lamps 28A–F and being coterminous with the next adjacent section(s), e.g., at its upper edge, surface 54B is coterminous with surface 54A, and at its lower edge, section 54B is coterminous with section 54C. The interior sections 54B–E are shaped identically to one another, and the end sections 54A and F are mirror images of one another.

For clarity, only the interior section 54B will be described completely, it being understood that the interior sections 54C–E are identical to the section 54B, and how the end sections 54A and F differ will be described. Corresponding elements of each surface section are identified with the alphabetic character which identifies that section.

The section 54B is divided in half by an apex ridge B1 which runs laterally parallel to the lamp 28B. On each side of the apex ridge B1, the section 54B curves away from the apex B1 with surfaces B2 and B3 of a fixed radius R (FIG. 5) centered at points B8 and B9 for approximately 90°. In the preferred embodiment, this radius R is 2 millimeters and is equal to the radius of the lamp 28B. Of course, other dimensions could be used to practice the invention.

Figure 5:
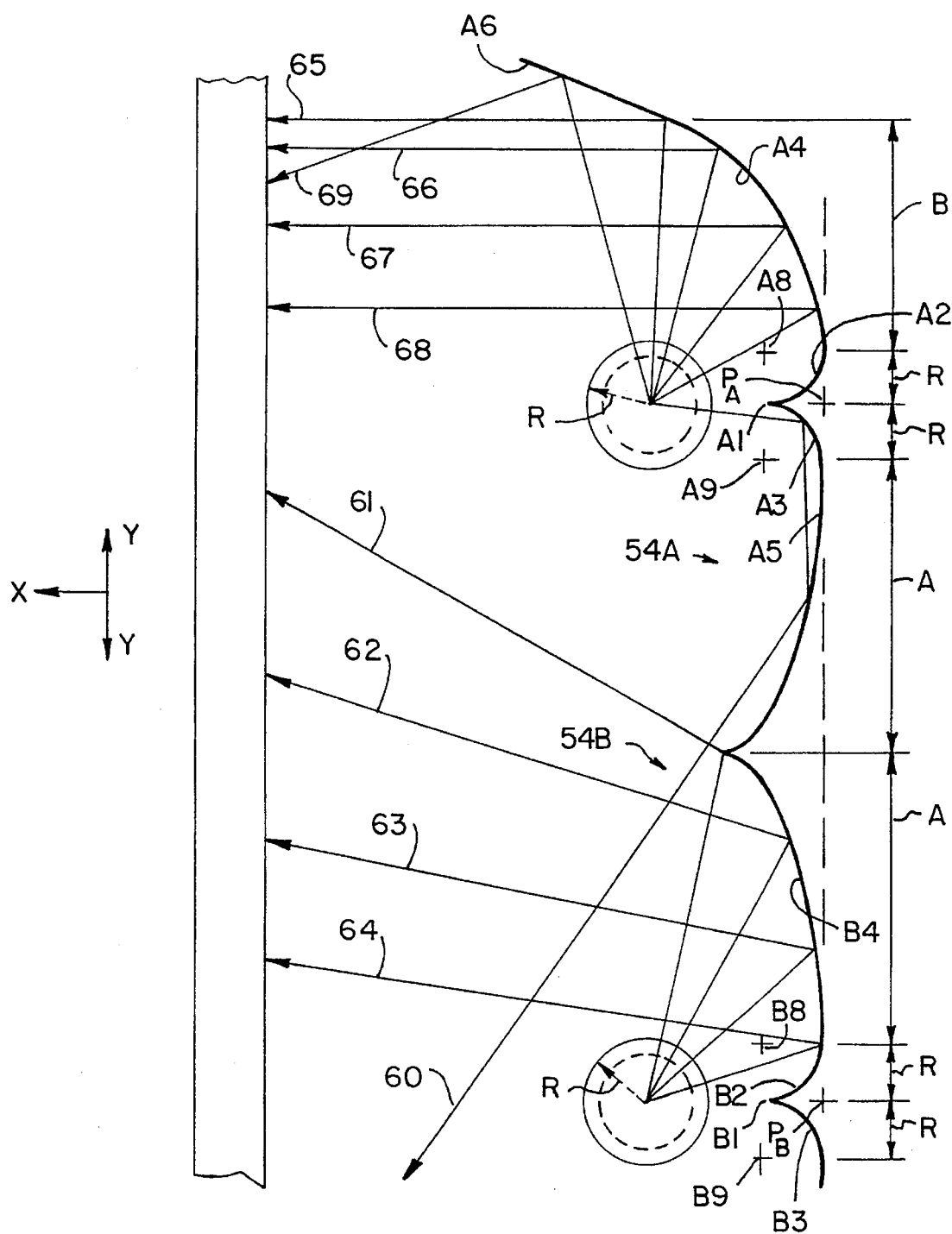
FIG. 5 is a schematic ray tracing of the backlight unit illustrated in FIGS. 1–4.

The constant radius surfaces B2 and B3 fade into respective surfaces B4 and B5 at their edges opposite from the apex B1. The surfaces B4 and B5 are defined by a hyberbolic function of the form: $x^2/m - y^2/n = k$, where x and y are the dimensions as indicated in FIG. 5 as measured from point $P_B$, and k, m and n are constants. In the preferred embodiment, k=1 millimeter and m and n are 93.3 millimeters and 158.3 millimeters, respectively. In addition, the dimension B is approximately 7.39 millimeters and A is 9.635 millimeters.

The outer sections 54A and F are the same as the interior sections 54B–E except that the surfaces A4 and F5 are parabolic rather than hyperbolic and are coterminous at their outer ends with a flat angled surface A6 and F6, respectively. A flat angled surface similar to the surfaces A6 and F6 may also be used to join the surface 50 at its lateral ends to the flange 52.

The parabolic function defining the surfaces A4 and F5 is of the form $y^2 = kx$ (millimeters) where x and y are as defined above and for values of y greater than R and, in the preferred embodiment, less than 9.39 millimeters.

FIG. 5 illustrates section 54A and the surfaces B2 and B4 of section 54B. Since the surfaces A3 and A5 of section 54A are identical to the corresponding surfaces in the interior sections,-surfaces B2 and B4 are identical to the corresponding surfaces in the interior sections and to F2 and F4, and the surfaces A2, A4 and A6 are mirror images of the surfaces F3, F5 and F6, respectively, FIG. 5 is used to give a complete description of the reflection pattern of the entire reflector 26.

First, the function of the radiused surfaces A2, A3, B2 and B3 is to reflect the light being transmitted rearwardly from the corresponding lamp (28A or B) toward the display 18. This can be explained by reference to ray 60. Light impinging on Constant radius surface A3 is reflected therefrom toward hyperbolic surface A5 and therefrom is reflected toward the interior of the display 18, crossing over the next adjacent surface section 54B. Thus, if the lamp 28B were to become dim or burn out, light reflected from lamp 28A would serve to fill in the space otherwise illuminated by light 28B, and also light from the lamp 28C would serve to fill in the same space. The hyperbolic surfaces (A5–E5 and B4–F4) also serve to fan out the light rays impinging directly upon them, as illustrated by rays 61–64, to help fill in the next adjacent space should the lamp in that space become dim or fail completely.

The parabolic surfaces A4 and F5 in contrast tend to collimate the light reflected from them. Collimation rather than dispersion is desired here so as to direct the light toward the display 18, rather than outwardly past the edge of the display 18 where it would only serve to illuminate the ambient. Such collimation is represented by rays 65–68. The flat angled surfaces A6 and F6 also serve the function of reflecting light back toward the display. This is represented by ray 69.

Preferred embodiments of the invention have been described in considerable detail. Many modifications and variations to the preferred embodiments described will be apparent to those skilled in the art. For example, the invention is not strictly limited to being used with separate straight cylindrical parallel lamps, but could be used with a serpentine cylindrical lamp having straight parallel light source sections. Therefore, the invention should not be limited to the embodiments described, but should be defined by the claims which follow.

I claim:

1. In a reflector for multiple parallel cylindrical light sources of the type having an arcuate reflective surface section for each parallel light source, each surface section defining an apex ridge directly behind the corresponding light source and said surface section extending from both sides of said apex ridge in arcuate surfaces, the improvement wherein said arcuate surfaces extending from said apex are defined by a constant radius surface, and wherein at least one of said constant radius surfaces is joined at its edge opposite from said apex ridge by a hyperbolic surface.

2. The improvement as claimed in claim 1, wherein said constant radius surface extends from said apex for approximately 90°.

3. The improvement as claimed in claim 1, wherein at least one of said constant radius surfaces is joined at its edge opposite from said apex ridge by a parabolic surface.

4. The improvement as claimed in claim 2 in which the reflector and light sources comprise a backlight unit arranged for backlighting of a display which is mounted in an enclosure, wherein said enclosure includes:

a front panel in which said display is mounted so as to present a rear surface of said display facing toward the rear of said front panel;

a cover;

a hinge securing said cover to said front panel so as to pivot said cover relative to said display between and open and a closed position; and means for removably securing said backlight unit to said cover so that when said cover is in said closed position, said backlight unit overlies the rear of said display and is in position to transmit light to the rear of said display.

5. The improvement as claimed in claim 4 wherein an air gap is formed between said backlight unit and said display when said cover is in the closed position.

6. The improvement as claimed in claim 4 in which the backlight unit is accessible for removal when the cover is in the open position.

7. The improvement as claimed in claim 1 in which the reflector and light sources comprise a backlight unit arranged for backlighting of a display which is mounted in an enclosure, wherein said enclosure includes:

a front panel in which said display is mounted so as to present a rear surface of said display facing toward the rear of said front panel;

a cover;

a hinge securing said cover to said front panel so as to pivot said cover relative to said display between and open and a closed position; and means for removably securing said backlight unit to said cover so that when said cover is in said closed position, said backlight unit overlies the rear of said display and is in position to transmit light to the rear of said display.

8. The improvement as claimed in claim 7 wherein an air gap is formed between said backlight unit and said display when said cover is in the closed position.

9. The improvement as claimed in claim 7 in which thee backlight unit is accessible for removal when the cover is in the open position.

10. In a reflector for multiple parallel cylindrical light sources of the type having an arcuate reflective surface section for each parallel light source, each surface section defining an apex ridge directly behind the corresponding light source and said surface section extending from both sides of said apex ridge in arcuate surfaces, the improvement wherein said arcuate surfaces extending from said apex are defined by a constant radius surface, and wherein on both sides of said apex ridge said constant radius surfaces are joined by hyperbolic surfaces.

11. The improvement as claimed in claim 10 in which the reflector and light sources comprise a backlight unit arranged for backlighting of a display which is mounted in an enclosure, wherein said enclosure includes:

a front panel in which said display is mounted so as to present a rear surface of said display facing toward the rear of said front panel;

a cover;

a hinge securing said cover to said front panel so as to pivot said cover relative to said display between and open and a closed position; and means for removably securing said backlight unit to said cover so that when said cover is in said closed position, said backlight unit overlies the rear of said display and is in position to transmit light to the rear of said display.

12. The improvement as claimed in claim 11 wherein an air gap is formed between said backlight unit and said display when said cover is in the closed position.

13. The improvement as claimed in claim 11 in which the backlight unit is accessible for removal when the cover is in the open position.

14. The improvement as claimed in claim 10, wherein said constant radius surface extends from said apex for approximately 90°.

15. In a reflector for multiple parallel cylindrical light sources of the type having an arcuate reflective surface section for each parallel light source, each surface section defining an apex ridge directly behind the corresponding light source and said surface section extending from both sides of said apex ridge in arcuate surfaces, the improvement wherein said arcuate surfaces extending from said apex are defined by a constant radius surface, and wherein on one side of said apex ridge said constant radius surface is joined by a hyperbolic surface and on the other side of said apex ridge said constant radius surface is joined by a parabolic surface.

16. The improvement as claimed in claim 15, wherein said parabolic surface is coterminous with a flat surface.

17. The improvement as claimed in claim 15 in which the reflector and light sources comprise a backlight unit arranged for backlighting of a display which is mounted in an enclosure, wherein said enclosure includes:

a front panel in which said display is mounted so as to present a rear surface of said display facing toward the rear of said front panel;

a cover;

a hinge securing said cover to said front panel so as to pivot said cover relative to said display between and open and a closed position; and means for removably securing said backlight unit to said cover so that when said cover is in said closed position, said backlight unit overlies the rear of said display and is in position to transmit light to the rear of said display.

18. The improvement as claimed in claim 17 wherein an air gap is formed between said backlight unit and said display when said cover is in the closed position.

19. The improvement as claimed in claim 17 in which the backlight unit is accessible for removal when the cover is in the open position.

20. The improvement as claimed in claim 15, wherein said constant radius surface extends from said apex for approximately 90°.

\* \* \* \* \*